United States Patent
Bauer et al.

(10) Patent No.: US 8,037,867 B2
(45) Date of Patent: Oct. 18, 2011

(54) METHOD AND DEVICE FOR CONTROLLING AN INTERNAL COMBUSTION ENGINE

(75) Inventors: Joachim Bauer, Offenbach am Main (DE); Ralf Koch, Usingen (DE)

(73) Assignee: Continental Automotive GmbH, Hannover (DE)

( * ) Notice: Subject to any disclaimer, the term of this patent is extended or adjusted under 35 U.S.C. 154(b) by 232 days.

(21) Appl. No.: 12/254,126

(22) Filed: Oct. 20, 2008

(65) Prior Publication Data

US 2009/0101109 A1    Apr. 23, 2009

(30) Foreign Application Priority Data

Oct. 23, 2007  (DE) .......................... 10 2007 050 618

(51) Int. Cl.
*F02P 5/00* (2006.01)
*G06F 19/00* (2011.01)
*G06G 7/70* (2006.01)
(52) U.S. Cl. .................... 123/406.37; 701/111
(58) Field of Classification Search ............ 123/406.21, 123/406.29, 406.34, 406.37; 701/111; 73/35.01, 73/35.09
See application file for complete search history.

(56) References Cited

U.S. PATENT DOCUMENTS

| | | | | |
|---|---|---|---|---|
| 5,000,150 A | * | 3/1991 | Miyama et al. | 123/406.33 |
| 5,035,219 A | * | 7/1991 | Ohkumo et al. | 123/406.33 |
| 5,038,736 A | * | 8/1991 | Ohkumo et al. | 123/406.33 |
| 5,040,510 A | * | 8/1991 | Krebs et al. | 123/406.37 |
| 5,230,316 A | * | 7/1993 | Ichihara et al. | 123/406.38 |
| 5,267,164 A | * | 11/1993 | Miyama | 701/111 |
| 5,934,256 A | * | 8/1999 | Wenzlawski et al. | 123/479 |
| 2003/0164156 A1 | * | 9/2003 | Galtier | 123/406.21 |
| 2005/0098156 A1 | * | 5/2005 | Ohtani | 123/431 |
| 2005/0197762 A1 | * | 9/2005 | Yoshino et al. | 701/111 |
| 2006/0129303 A1 | * | 6/2006 | Sauler et al. | 701/111 |

FOREIGN PATENT DOCUMENTS

| | | |
|---|---|---|
| DE | 100 41 777 A1 | 3/2002 |
| DE | 10 2005 035 239 A1 | 2/2007 |
| EP | 0 399 068 B1 | 5/1989 |

* cited by examiner

*Primary Examiner* — Erick Solis
*Assistant Examiner* — Sizo Vilakazi
(74) *Attorney, Agent, or Firm* — King & Spalding L.L.P.

(57) ABSTRACT

In a method and a device for controlling an internal combustion engine (1), the accuracy of the detection of knocking in an internal combustion engine (1) can be increased by determining a reference ignition advance angle for an actual operating point of the internal combustion engine (1) at which the efficiency of the engine is a maximum. An actual ignition advance angle at which the internal combustion engine (1) is to be operated at the actual operating point is determined. Signals from a knocking sensor (14) are detected, allowing conclusions to be drawn concerning a knocking event in a combustion chamber (30) of the internal combustion engine (1). To detect knocking, only the signal values which lie within a predetermined evaluating interval are used, wherein the position of the evaluating interval is determined depending on the difference between the reference ignition advance angle and the actual ignition advance angle.

14 Claims, 3 Drawing Sheets

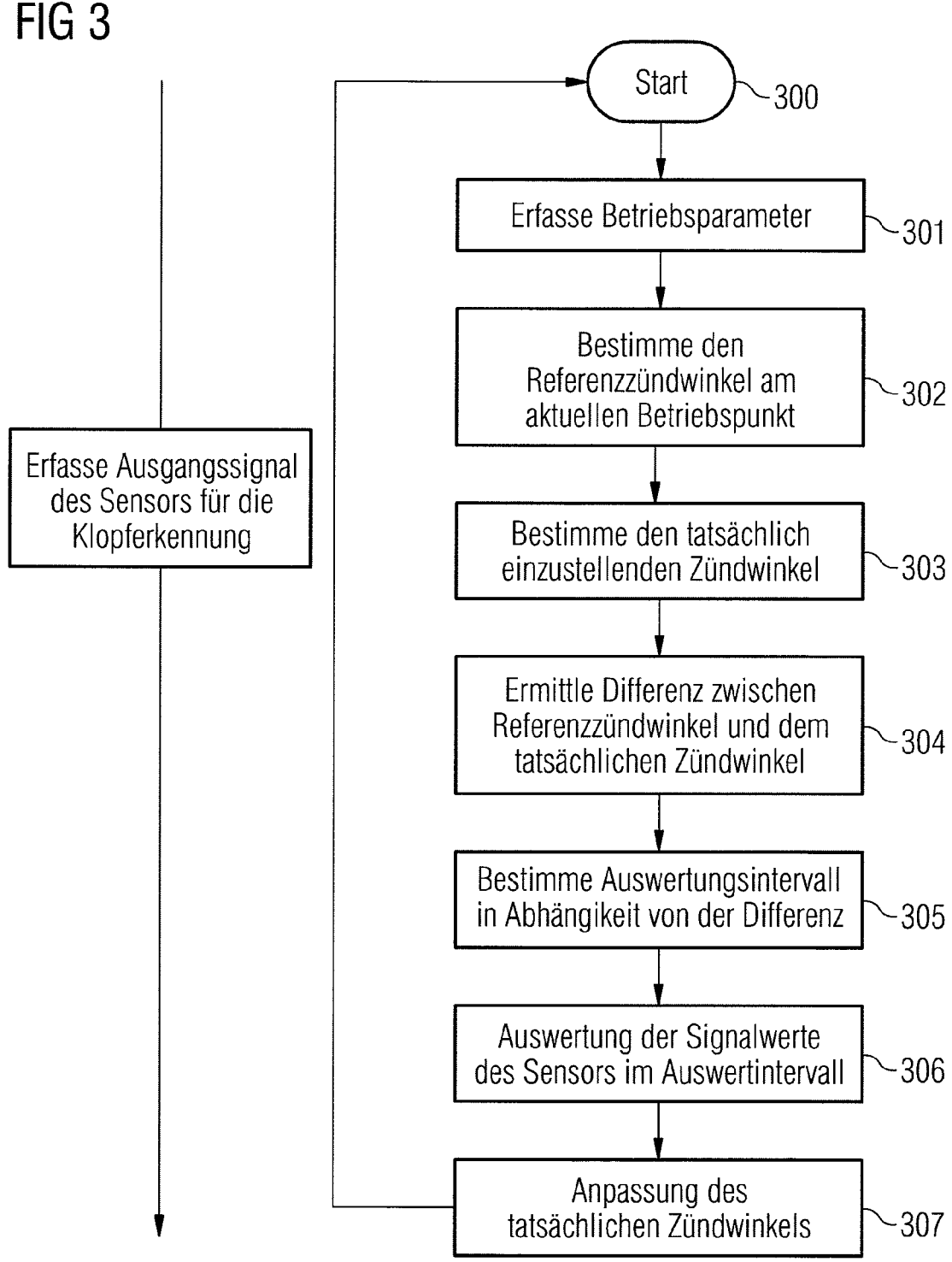

METHOD AND DEVICE FOR CONTROLLING AN INTERNAL COMBUSTION ENGINE

CROSS-REFERENCE TO RELATED APPLICATIONS

This application claims priority to German Patent Application No. 10 2007 050 618.1 filed Oct. 23, 2007, the contents of which is incorporated herein by reference in its entirety.

TECHNICAL FIELD

The invention relates to a method for controlling an internal combustion engine and a control device for carrying out said method.

BACKGROUND

Modern engine electronics systems and associated control methods enable ever greater optimization of the efficiency of an internal combustion engine. In the case of Otto engines the timing position of the ignition point plays an essential role therein. The efficiency or torque produced by an Otto engine has a maximum which is dependent on the ignition advance angle. For the sake of protecting components, however, this optimum ignition advance angle can only be set to a few operating points. In large parts of the operating range of the internal combustion engine, operation of the internal combustion engine at this optimum ignition advance angle would lead to engine knocking and thus eventually to damage to the internal combustion engine. For this reason, in these operating ranges, the internal combustion engine must be operated with an ignition advance angle at which the efficiency is reduced. In the attempt to reach the highest efficiency level possible for each operating point, whilst simultaneously avoiding damage, modern engine control concepts include 'knocking control systems' which detect engine knocking and adjust the set ignition advance angle accordingly. By this means, the set ignition advance angle can be made to lie very close to the knocking limit of the engine.

In order to detect engine knocking, a knocking sensor can be integrated on or in the engine. The knocking events typically take place within a limited crankshaft angular interval about the top dead centre point of the piston. In order to ensure reliable detection of a knocking event by means of the sensor, it is necessary to restrict evaluation of the sensor signal to the narrowest possible crankshaft angular interval within which knocking could possibly occur. The narrower the crankshaft angular interval for evaluating the sensor signal, the more reliably knocking can be detected and separated from normal combustion. However, the knocking tendency of an internal combustion engine is influenced by a large number of factors, such as the ambient air temperature, the engine temperature, the exhaust gas recirculation rate and the fuel quality.

In a known method, these factors are permanently kept available for defining the evaluating interval of the knocking sensor signal, so that it is always substantially longer than the actual knocking event. Apart from the actual knocking events, the signal from the knocking sensor which is to be evaluated therefore also has the basic engine noise that remains even despite filtration, together with other interfering signals, which negatively influence the accuracy of knocking detection. The interfering signals include, for example, sounds from the opening and closing of the inlet and outlet valves.

SUMMARY

A method and a device for controlling an internal combustion engine can be provided, by means of which the accuracy of the knocking detection can be increased.

According to an embodiment, a method for controlling an internal combustion engine, may comprise the steps of: for an actual operating point of the internal combustion engine, determining a reference ignition advance angle at which the efficiency of the internal combustion engine is at a maximum; determining an actual ignition advance angle at which the internal combustion engine is to be operated at the actual operating point; detecting signal values which enable conclusions to be drawn concerning a knocking event in a combustion chamber of the internal combustion engine from a sensor; to detect knocking, taking into account only the signal values that lie within a predetermined evaluating interval; and determining the position of the evaluating interval depending on the difference between the reference ignition advance angle and the actual ignition advance angle.

According to a further embodiment, the actual ignition angle can be determined in that the reference ignition advance angle is corrected depending on at least one operating parameter of the internal combustion engine. According to a further embodiment, the at least one operating parameter may influence the knocking tendency of the internal combustion engine. According to a further embodiment, the evaluating interval may be stipulated by its length and the position of a limit value relative to a top dead centre of a piston provided in the combustion chamber. According to a further embodiment, the angular position of a crankshaft of the internal combustion engine can be used as a measure for the length and position of the limit value of the evaluating interval. According to a further embodiment, the greater the difference between the reference ignition advance angle and the actual ignition advance angle, the further the position of the evaluating interval relative to top dead centre of a piston of the internal combustion engine may be displaced in the 'retard' direction. According to a further embodiment, the sensor can be a combustion chamber pressure sensor for detecting the change of pressure in the combustion chamber. According to a further embodiment, the sensor can be a structure-borne sound sensor for detecting the combustion sounds in the combustion chamber.

According to another embodiment, a control device for an internal combustion engine may be operable, for an actual operating point of the internal combustion engine, to determine a reference ignition advance angle at which the efficiency of the internal combustion engine is at a maximum; to determine an actual ignition advance angle at which the internal combustion engine is to be operated at the actual operating point; to detect signal values which enable conclusions to be drawn concerning a knocking event in a combustion chamber of the internal combustion engine from a sensor; for detecting knocking, to take into account only the signal values that lie within a predetermined evaluating interval; and to determine the position of the evaluating interval is determined depending on the difference between the reference ignition advance angle and the actual ignition advance angle.

BRIEF DESCRIPTION OF THE DRAWINGS

The invention will now be described in greater detail using one exemplary embodiment and by reference to the drawings, in which:

FIG. 3 shows an exemplary embodiment of a control method for an internal combustion engine in the form of a flow diagram.

DETAILED DESCRIPTION

Figure 1:
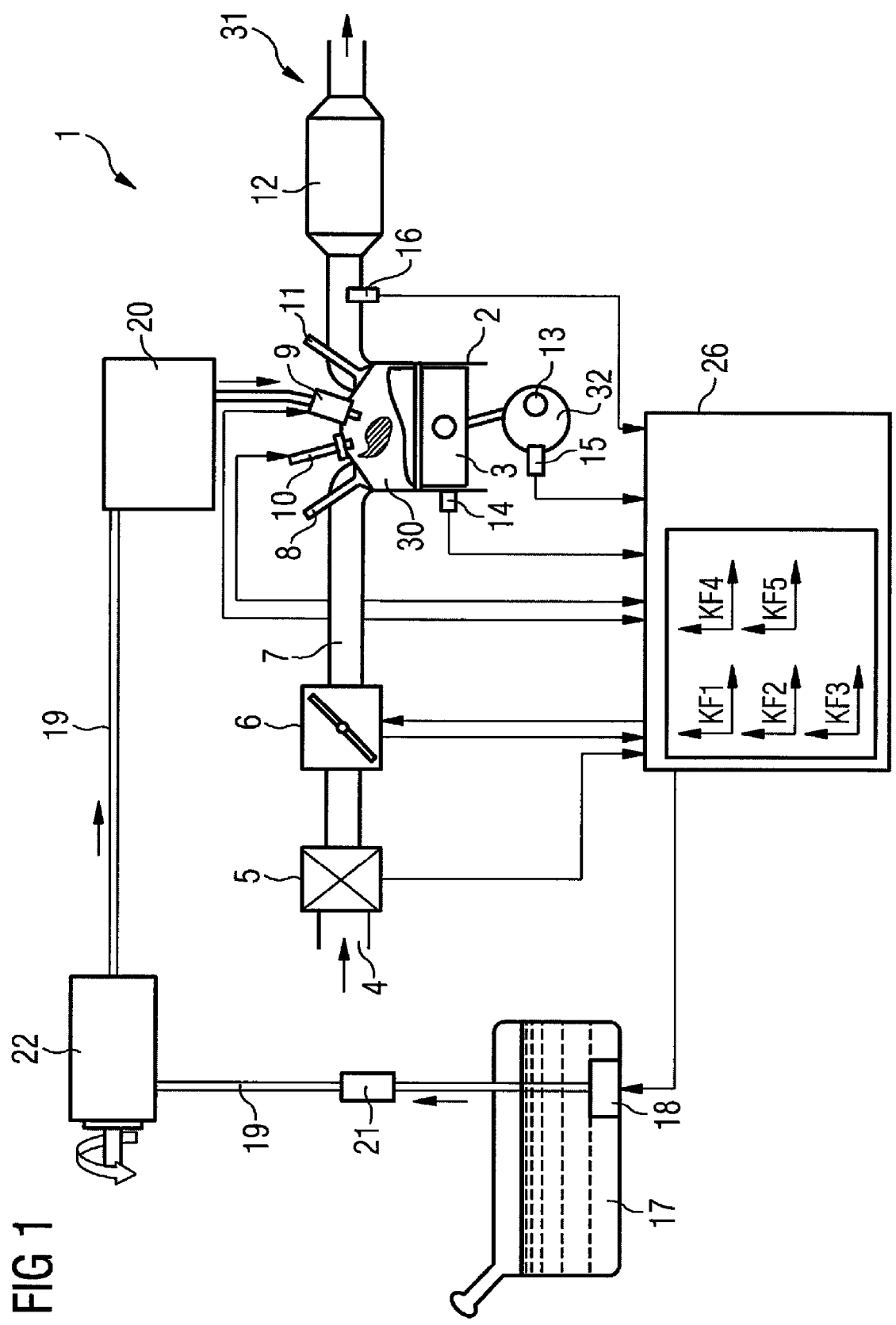
FIG. 1 shows a schematic representation of an internal combustion engine.

In the method for controlling an internal combustion engine according to an embodiment, for an actual operating point of the internal combustion engine, a reference ignition advance angle at which the efficiency of the engine is at a maximum is determined. Furthermore, an actual ignition advance angle is determined with which the engine is to be operated at this operating point. Signal values which enable conclusions to be drawn concerning a knocking event in a combustion chamber of the internal combustion engine are detected from a sensor. To detect knocking, only the signal values coming from the sensor which lie within a predetermined evaluating interval are taken into account. The position of the evaluating interval is determined here as a function of the difference between the reference ignition advance angle and the actual ignition advance angle.

In modern engine control concepts, for example, mapped engine control functions, the ignition advance angle or ignition time point that is to be set at an actual operating point is determined based upon an optimum reference ignition advance angle (point of maximum efficiency). The reference ignition advance angle is corrected to the extent that knocking is avoided as far as possible. It should be noted, however, that this anticipatory control of the ignition time point can never entirely rule out knocking. The ignition advance angle that is actually to be set therefore already includes the corrections needed to avoid knocking. The spacing or difference between the reference ignition advance angle and the actual ignition advance angle is therefore a measure of the knocking tendency of the internal combustion engine under current operating conditions. If the position of the evaluating interval is determined as a function of the difference between the reference ignition advance angle and the actual ignition advance angle, the anticipation value previously included in the length of the evaluating interval can be dispensed with or at least significantly reduced. Interfering signals are thereby largely excluded. This increases the precision of delineation and significantly improves the accuracy of detection of a knocking event.

In an embodiment of the method, the actual ignition advance angle is determined in that the reference ignition advance angle is corrected depending on at least one operating parameter of the engine.

In an embodiment of the method, the at least one parameter influences the knocking tendency of the internal combustion engine.

The embodiments of the method enable determination of the actual ignition advance angle in a simple manner from the software standpoint, depending on the reference ignition advance angle, and taking account of the operating parameters or operating conditions of the internal combustion engine. Since at least one of the operating parameters influences the knocking tendency of the engine, the position of the evaluating interval can be determined in an optimal manner. Any interference which falsifies the results on evaluation of the sensor signal can thus be excluded. This significantly increases the accuracy of the detection of a knocking event.

In an embodiment of the method, the evaluating interval is stipulated by its length and the position of a limit value relative to a top dead centre of a piston provided in the combustion chamber.

In an embodiment, the angular position of a crankshaft of the internal combustion engine can be used as a measure for the length and position of the evaluating interval.

Since, in most internal combustion engines, a sensor is provided for the crankshaft position or for detecting the crankshaft angle, the position of the evaluating interval can be determined particularly well by specification of the length and a limit value of the evaluating interval relative to top dead centre of a piston arranged in the combustion chamber. By this means, the evaluating interval can be stipulated by simple means, particularly exactly and reproducibly. This is particularly useful since, in most control concepts, the ignition advance angle is already specified relative to the top dead centre as a reference point.

In an embodiment of the method, the greater the difference between the reference ignition advance angle and the actual ignition advance angle, the further the position of the evaluating interval relative to a top dead centre of a piston of the engine is displaced in the 'retard' direction.

This embodiment of the method is based on the knowledge that, as the tendency of the internal combustion engine towards knocking increases, the difference between the reference ignition advance angle and the actual ignition advance angle increases. This relates to the fact that, as the risk of knocking increases, for the sake of component protection, the actual ignition advance angle is displaced ever further in the 'retard' direction. By this means, the position of the evaluating interval can be suitably adapted to the position of the actual ignition advance angle.

In the embodiments, the sensor is either a combustion chamber pressure sensor or a structure-borne sound sensor.

These sensors enable reliable conclusions to be drawn regarding a knocking event in the combustion chamber of the internal combustion engine.

A control device for an internal combustion engine may be suitable for carrying out the above described method. The advantages thereof are set out in the description relating to the method.

FIG. 1 shows a schematic representation of an internal combustion engine 1 for a motor vehicle (not shown). For the sake of clarity, the representation is greatly simplified.

The internal combustion engine 1 comprises a plurality of combustion chambers 30, each of which is delimited by a cylinder 2 and a piston 3 which is movable up and down (in FIG. 1, for reasons of clarity, only one combustion chamber 30 is shown). The internal combustion engine 1 also comprises an intake tract 7 in which, upstream of an intake opening 4, an air-flow sensor 5 and a throttle valve 6 are arranged. The fresh air required for combustion is fed into the combustion chamber 30 by way of the intake tract 7 and the fresh air feed is controlled by opening and closing of an intake valve 8.

The internal combustion engine 1 illustrated here is an internal combustion engine 1 with direct fuel injection, wherein the fuel required for combustion is injected, in each case, via an injection valve 9 directly into each combustion chamber 30. A spark plug 10 projecting into the respective combustion chamber 30 serves to trigger the combustion. The combustion exhaust gases are discharged via outlet valves 11 into an exhaust tract 31 of the internal combustion engine 1 and cleaned by means of an exhaust catalytic converter 12 arranged in the exhaust tract 31.

Force transmission to a drive train of a motor vehicle (not shown) is carried out by means of a crankshaft 13 coupled to the piston 3. The internal combustion engine 1 also has a lambda sensor 16 for detecting the oxygen content of the exhaust gas, a crankshaft angle sensor 15 for detecting the rotational position of the crankshaft 13 and a knocking sensor 14, by means of which knocking can be detected. The knocking sensor 14 can be a combustion chamber pressure sensor to detect the pressure in the combustion chamber 30 or a structure-borne sound sensor to detect vibrations in or on the housing of the internal combustion engine 1.

A fuel supply system is assigned to the internal combustion engine 1, said fuel supply system comprising a fuel tank 17 and a fuel pump 18 arranged therein. The fuel is conveyed by means of the fuel pump 18 in a supply line 19 which connects the fuel tank to the injection valves 9. Arranged in the supply line are a fuel filter 21, a high pressure pump 22 and a pressure reservoir 20. The pressure reservoir is a common pressure reservoir 20 from which the injection valves 9 for a plurality of combustion chambers 30 are supplied with pressurized fuel. The high pressure pump 22 serves to feed the fuel supplied by the fuel pump 18 at a relatively low pressure (approximately 3 bar) to the pressure reservoir 20 at a high pressure (in a spark-ignition engine, typically up to 150 bar).

A control device 26 is assigned to the internal combustion engine 1, said control device 26 being connected via signal and data lines to all the actuators and sensors. In the control system 26, mapped engine control functions (KF1 to KF5) are implemented on the basis of software. Based on the measurement values from the sensors and the mapped engine control functions, control signals are emitted to the actuators of the internal combustion engine 1 and the fuel supply system. Thus the control system 26 is linked via the data and signal lines to the fuel pump 18, the air-flow sensor 5, the throttle valve 6, the spark plug 10, the injection valve 9, the knocking sensor 14, the crankshaft angle sensor 15 and the lambda sensor 16.

Figure 2:
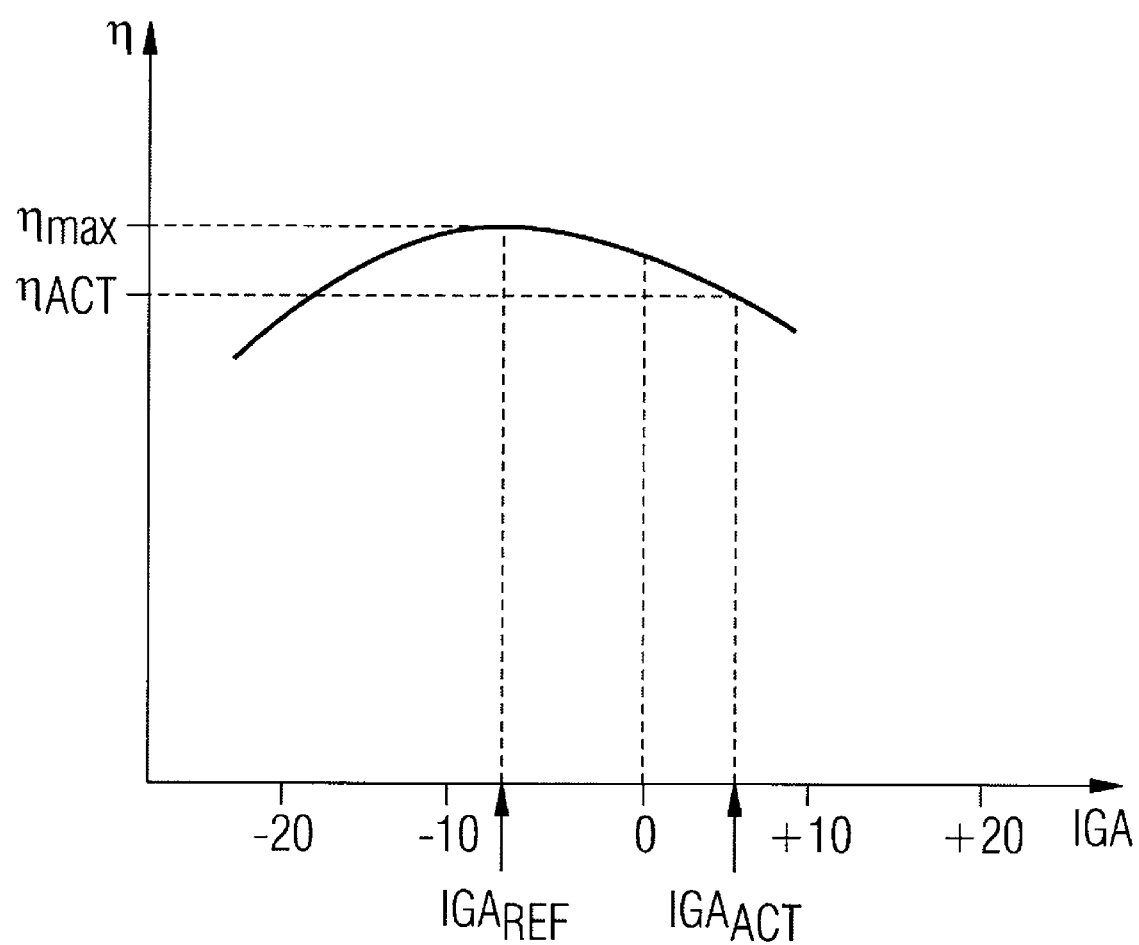
FIG. 2 shows a schematic representation of the efficiency of an internal combustion engine as a function of the set ignition advance angle at a particular operating point.

FIG. 2 shows schematically the efficiency q of the internal combustion engine 1 as a function of the ignition advance angle IGA or the ignition time point for a particular operating point. This means that, in this diagram, all the operating parameters that influence the torque produced by the internal combustion engine 1 are kept constant and only the ignition advance angle IGA is varied. The parameters which influence the torque production of the internal combustion engine 1 include, for example, the fresh air flow rate fed in, the engine speed and possibly the quantity of exhaust recirculated. The ignition advance angle IGA is represented on the X-axis in degrees of crankshaft angle relative to top dead centre of the piston which is movable up and down in the cylinder. The crankshaft position with the piston 3 at top dead centre is therefore the reference point for setting the ignition advance angle and is given the crankshaft angle value of 0°.

In FIG. 2, negative values of the crankshaft angle denote crankshaft positions before reaching top dead centre, whereas positive values of the crankshaft angle denote all positions after reaching top dead centre. As is clearly apparent, the efficiency $\eta$ of the internal combustion engine reaches a maximum $\eta_{Max}$ at a particular reference ignition advance angle $IGA_{Ref}$. For calibration purposes, this reference ignition advance angle $IGA_{Ref}$ should be chosen such that, for example, the combustion mid-point (when 50% of the mixture in the cylinder has been combusted) occurs at a crankshaft angle of approximately +6° to +8°, meaning that it lies at a point between 6° and 8° after top dead centre is reached. With ignition time points that are earlier or later, the efficiency $\eta$ of the internal combustion engine 1 is lower.

It is, naturally, fundamentally desirable to reach the maximum possible efficiency $\eta_{Max}$ at every operating point of the internal combustion engine 1 and, for that purpose, to set the reference ignition advance angle $IGA_{Ref}$. However, this is only possible in a few operating ranges of the internal combustion engine 1. In large operating ranges, the ignition advance angle IGA must be displaced towards 'retard' to avoid knocking (in FIG. 2, towards the more positive values of IGA). In order to avoid the possibility of knocking, therefore, an actual ignition advance angle $IGA_{Act}$ is set in large operating ranges of the internal combustion engine 1, wherein the internal combustion engine 1 has a low efficiency $\eta_{Act}$. In order to prevent knocking from occurring all together, the actual ignition advance angle $IGA_{Act}$ is determined based on the reference ignition advance angle $IGA_{Ref}$, taking account of correction values for component protection. These correction values are determined as a function of measured operating parameters which have an influence on the knocking tendency of the internal combustion engine 1. Said operating parameters include, for example, the ambient temperature, the engine temperature, the load (fresh air flow or inlet pipe), the engine speed, the fuel quality, where relevant, and the exhaust gas recirculation rate. The correction values for determining the actual ignition advance angle $IGA_{Act}$ can be determined, for example, based on characteristic curves. As made clear in FIG. 2, the distance or difference between the reference ignition advance angle $IGA_{Act}$ and the actual ignition advance angle $IGA_{Ref}$ varies depending on the knocking tendency of the internal combustion engine 1. The greater the knocking tendency at the respective operating point, the higher are the correction values for determining the actual ignition advance angle $IGA_{Act}$, so that, with increasing knocking tendency, said angle is ever further removed from the reference ignition advance angle $IGA_{Act}$ in the 'retard' direction.

As a consequence of the large number of influencing parameters and the aim to achieve the highest possible level of efficiency, knocking cannot always be avoided by means of this anticipatory control of the ignition point with specification of the calculated actual ignition advance angle $IGA_{Act}$. For this reason, it is necessary to install a suitable knocking detection system in the internal combustion engine 1. The knocking detection system is implemented with a control device 26 and makes use of the signal from the knocking sensor 14. For this purpose, the signal from the knocking sensor 14 produced within a pre-determined evaluating interval is evaluated. For example, the signal values within the evaluating interval can be integrated and then compared with a pre-determined threshold value. If the integrated signal value lies above the threshold value, knocking is considered to be detected.

The accuracy of detection of knocking depends essentially on the position and length of the evaluating interval. The position of the evaluating signal can be determined relative to a pre-determined reference point which may be, for example, a particular rotary position of the crankshaft of the internal combustion engine 1. As described above, the reference point may be the rotary angle that the crankshaft 13 assumes at top dead centre of the piston 3. The position of the evaluating interval, however, can also be determined from the absolute rotary angular positions of the crankshaft 13. It is desirable, from the viewpoint of the precision of delineation, that the evaluating interval should be kept as narrow as possible, whilst at the same time it must be ensured that the evaluating interval covers the angular range of the crankshaft in which the knocking occurs.

FIG. 3 shows, in schematic form, an exemplary embodiment of a control method for an internal combustion engine 1 in the form of a flow diagram by means of which determination of the position of the evaluating interval can be optimized.

The method is started at step 300, for example, on starting the internal combustion engine 1. From the start of the method, the output signal of the knocking sensor 14 is detected continuously. The values from this knocking sensor 14 are therefore available to the control device 26 at any time during operation of the internal combustion engine 1.

Following starting of the method, in step 301, the values of the operating parameters are detected by the control device 26 in the form of sensor signals, or are calculated based on suitable physical models. The operating parameters are all physical variables which have an influence on the operating behavior of the internal combustion engine 1. These include, in particular, the engine speed, the temperature of the internal combustion engine 1, the quantity of fresh air fed to the internal combustion engine 1, the currently set ignition advance angle, the exhaust and combustion gas compositions and the ambient temperature.

Based on at least some of these operating parameters, in step 302, the reference ignition advance angle $IGA_{Ref}$ is determined at the current operating point of the internal combustion engine 1. The determination of the reference ignition advance angle $IGA_{Ref}$ can be carried out, for example, by means of a characteristic curve depending on the current engine speed and the quantity of fresh air fed in. Alternatively to the quantity of fresh air fed in, the pressure in the inlet pipe can also be used as a load parameter.

In step 303, the ignition advance angle $IGA_{Act}$ that is actually to be set and at which the internal combustion engine is to be operated at the current operating point is determined. As described above, the actual ignition advance angle $IGA_{Act}$ can be determined based on the reference ignition advance angle $IGA_{Ref}$, taking account of correction values. At least one correction value takes account of the knocking tendency of the internal combustion engine 1 depending on the detected operating parameters.

In step 304, the difference between the reference ignition advance angle $IGA_{Ref}$ and the actual ignition advance angle $IGA_{Act}$ is determined.

Depending on the difference determined, in step 305, the position of the evaluating interval is determined for the output signal of the knocking sensor 14. Advantageously, the position of the evaluating interval relative to the angular position of the crankshaft at top dead centre of the piston is determined. The evaluating interval can be defined, for example, by a delimiting value (start point or end point) and a width, that is, the size of the crankshaft angle over which the output signal of the knocking sensor is used for knocking detection. The width of the evaluating interval can either be given as a fixed amount, or can be varied depending on relevant operating parameters. Alternatively, the evaluating interval can be defined by stipulating the start and end values.

As described above, the difference between the reference ignition advance angle $IGA_{Ref}$ and the actual ignition advance angle $IGA_{Act}$ becomes greater as the knocking tendency increases. This is related to the fact that, in order to avoid knocking, the actual ignition advance angle $IGA_{Act}$ is displaced, relative to the reference ignition advance angle $IGA_{Ref}$, further in the 'retard' direction. The position of the evaluating interval is advantageously varied such that the greater the difference between the reference ignition advance angle $IGA_{Ref}$ and the actual ignition advance angle $IGA_{Act}$, the further the evaluating interval is displaced in the 'retard' direction, and such that the smaller the difference between the reference ignition advance angle $IGA_{Ref}$ and the actual ignition advance angle $IGA_{Act}$, the further the evaluating interval is displaced in the 'advance' direction (in FIG. 2, in the direction of a more negative value of IGA).

In step 306, the signal values from the knocking sensor during the evaluating interval are used in order to detect any knocking events. As described above, for this purpose, the signal from the knocking sensor 14 can be integrated and a knocking event is detected if the integrated signal exceeds a pre-determined limit value.

In step 306, knocking is detected and in step 307, the actual ignition advance angle $IGA_{Act}$ is adjusted so that no more knocking events occur. This may take place, for example, by means of an additive correction value during determination of the actual ignition advance angle $IGA_{Act}$. In this process, the actual ignition advance angle $IGA_{Act}$ is displaced by a pre-determined amount in the 'retard' direction.

If knocking is not detected in step 306, then the actual ignition advance angle $IGA_{Act}$ is either maintained in step 307 or, in order to increase the efficiency of the internal combustion engine 1, is displaced by a pre-determined amount in the 'advance' direction.

Following adjustment of the actual ignition advance angle, the sequence is started anew.

The method according to various embodiments offers flexible adjustment of the position of the evaluating interval to the actual operating and environmental conditions. By this means, the evaluating interval can be kept narrow and this increases the precision of delineation when evaluating the signal from the knocking sensor 14 and therefore the accuracy in detecting knocking. It is therefore no longer necessary, when stipulating the evaluating interval, to keep permanently available all the possible operating conditions that amplify the knocking tendency of the internal combustion engine 1.

What is claimed is:

1. A method for controlling an internal combustion engine, comprising:
    determining a top dead centre of a piston a combustion chamber;
    for an actual operating point of the internal combustion engine, determining a reference ignition advance angle at which the efficiency of the internal combustion engine is at a maximum, regardless of whether knocking occurs at the reference ignition advance angle,
    determining an actual ignition advance angle at which the internal combustion engine is to be operated at the actual operating point,
    detecting signal values from a sensor for detecting knocking in the combustion chamber,
    determining a position of a knock evaluating interval as a function of both (a) the difference between the reference ignition advance angle and the actual ignition advance angle, and (b) the top dead centre of the piston in the combustion chamber, such that the greater the difference between the reference ignition advance angle and the actual ignition advance angle, the further the position of a knock evaluating interval is adjusted in a retard direction relative to the top dead centre of the piston, and
    detecting knocking, taking into account only the signal values detected within the determined evaluating interval.

2. The method according to claim 1, wherein the actual ignition angle is determined in that the reference ignition advance angle is corrected depending on at least one operating parameter of the internal combustion engine.

3. The method according to claim 2, wherein the at least one operating parameter influences the knocking tendency of the internal combustion engine.

4. The method according to claim 1, wherein the angular position of a crankshaft of the internal combustion engine can be used as a measure for the length and position of the limit value of the evaluating interval.

5. The method according to claim 1, wherein the greater the difference between the reference ignition advance angle and the actual ignition advance angle, the further the position of the evaluating interval relative to top dead centre of a piston of the internal combustion engine is displaced in the 'retard' direction.

6. The method according to claim 1, wherein the sensor is a combustion chamber pressure sensor for detecting the change of pressure in the combustion chamber.

7. The method according to claim 1, wherein the sensor is a structure-borne sound sensor for detecting the combustion sounds in the combustion chamber.

8. A control device for an internal combustion engine, the control device operable:
- to determine a top dead centre of a piston in a combustion chamber;
- for an actual operating point of the internal combustion engine, to determine a reference ignition advance angle at which the efficiency of the internal combustion engine is at a maximum, regardless of whether knocking occurs at the reference ignition advance angle
- to determine an actual ignition advance angle at which the internal combustion engine is to be operated at the actual operating point,
- to detect signal values from a sensor for detecting knocking in the combustion chamber,
- to determine a position of a knock evaluating interval as a function of both (a) the difference between the reference ignition advance angle and the actual ignition advance angle, and (b) the top dead centre of the piston in the combustion chamber, such that the greater the difference between the reference ignition advance angle and the actual ignition advance angle, the further the position of a knock evaluating interval is adjusted in a retard direction relative to the top dead centre of the piston, and
- to detect knocking, taking into account only the signal values detected within the determined evaluating interval.

9. The device according to claim 8, wherein the actual ignition angle is determined in that the reference ignition advance angle is corrected depending on at least one operating parameter of the internal combustion engine.

10. The device according to claim 9, wherein the at least one operating parameter influences the knocking tendency of the internal combustion engine.

11. The device according to claim 8, wherein the angular position of a crankshaft of the internal combustion engine can be used as a measure for the length and position of the limit value of the evaluating interval.

12. The device according to claim 8, wherein the greater the difference between the reference ignition advance angle and the actual ignition advance angle, the further the position of the evaluating interval relative to top dead centre of a piston of the internal combustion engine is displaced in the 'retard' direction.

13. The device according to claim 8, wherein the sensor is a combustion chamber pressure sensor for detecting the change of pressure in the combustion chamber.

14. The device according to claim 8, wherein the sensor is a structure-borne sound sensor for detecting the combustion sounds in the combustion chamber.

* * * * *